United States Patent
Kim et al.

(10) Patent No.: US 9,471,831 B2
(45) Date of Patent: Oct. 18, 2016

(54) APPARATUS AND METHOD FOR FACE RECOGNITION

(71) Applicant: Samsung Electronics Co., Ltd., Suwon-si (KR)

(72) Inventors: Sang-yoon Kim, Yongin-si (KR); Hee-seob Ryu, Hwaseong-si (KR); Seung-kwon Park, Yongin-si (KR); Dong-ho Lee, Seoul (KR); Chan-hee Choi, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 99 days.

(21) Appl. No.: 14/041,564

(22) Filed: Sep. 30, 2013

(65) Prior Publication Data

US 2014/0119618 A1    May 1, 2014

(51) Int. Cl.
*G06K 9/40* (2006.01)
*G06K 9/00* (2006.01)
*G06K 9/03* (2006.01)

(52) U.S. Cl.
CPC ....... *G06K 9/00275* (2013.01); *G06K 9/00228* (2013.01); *G06K 9/036* (2013.01)

(58) Field of Classification Search
CPC .............. G06K 9/00221; G06K 9/00281; G06K 9/00228; G06K 9/00275; G06K 9/6256; G06K 9/00248; G06K 9/00315; G06K 9/00899; G06K 9/00268; G06K 9/00362; G06K 9/00892; G06K 9/036; G06K 9/46; G06K 9/6212
USPC ....... 382/118, 117, 100, 181, 190, 195, 199, 382/103, 254, 274, 164, 203, 209, 305, 232, 382/243, 155, 159, 173
See application file for complete search history.

(56) References Cited

U.S. PATENT DOCUMENTS

| | | | | |
|---|---|---|---|---|
| 7,330,570 B2* | 2/2008 | Sogo et al. | ................ | 382/115 |
| 8,131,023 B2* | 3/2012 | Ishikawa | ............ | G06K 9/00221 |
| | | | | 348/207.1 |
| 8,254,647 B1* | 8/2012 | Nechyba | ............ | G06K 9/00248 |
| | | | | 382/118 |
| 8,311,294 B2* | 11/2012 | Myers | ................ | G06K 9/00288 |
| | | | | 382/118 |
| 8,472,681 B2* | 6/2013 | Hamza | ................ | 382/117 |
| 8,538,139 B2* | 9/2013 | Kameyama | ................ | 382/159 |
| 8,965,061 B2* | 2/2015 | Hasebe | ................ | 382/115 |

(Continued)

FOREIGN PATENT DOCUMENTS

KR   10-2005-0091558   9/2005
KR   10-2008-0065532   7/2008

(Continued)

OTHER PUBLICATIONS

Terrance E. Boult et al., "Long-Range Facial Image Acquisition and Quality", Handbook of Remote Biometrics, 2009, pp. 169-192.*

(Continued)

*Primary Examiner* — Sheela C Chawan
(74) *Attorney, Agent, or Firm* — Staas & Halsey LLP (57) ABSTRACT

A control method of an apparatus for face recognition includes acquiring an image through an image acquirer, extracting a facial image from the acquired image, determining whether the extracted facial image meets a predetermined quality condition to decide use/non-use of the extracted facial image and performing a face recognizing operation by using the extracted facial image if the extracted facial image meets the predetermined quality condition.

16 Claims, 5 Drawing Sheets

(56) References Cited

U.S. PATENT DOCUMENTS

| | | | |
|---|---|---|---|
| 2008/0063241 A1* | 3/2008 | Moriya et al. | 382/112 |
| 2009/0060293 A1* | 3/2009 | Nagao | G06F 21/32 382/118 |
| 2009/0087099 A1* | 4/2009 | Nakamura | 382/190 |
| 2009/0232365 A1 | 9/2009 | Berthilsson et al. | |
| 2011/0064396 A1* | 3/2011 | Tanabe | 396/49 |
| 2011/0164792 A1* | 7/2011 | Yoon et al. | 382/118 |
| 2011/0311150 A1* | 12/2011 | Okamoto | 382/224 |
| 2012/0230545 A1 | 9/2012 | Zhang et al. | |
| 2012/0308141 A1* | 12/2012 | Okubo | 382/192 |
| 2013/0135508 A1* | 5/2013 | Inaba | 348/333.01 |

FOREIGN PATENT DOCUMENTS

| | | |
|---|---|---|
| KR | 10-2008-0085975 | 9/2008 |
| KR | 10-2010-0076714 | 7/2010 |
| KR | 10-2010-0102949 | 9/2010 |
| KR | 10-2011-0051714 | 5/2011 |
| KR | 10-2011-0107521 | 10/2011 |
| WO | 2012/109712 | 8/2012 |
| WO | WO 2012/109712 * | 8/2012 |

OTHER PUBLICATIONS

Extended European Search Report issued Apr. 4, 2014 in European Patent Application No. 13190363.5.

International Search Report dated Feb. 18, 2014 in International Patent Application No. PCT/KR2013/009310.

"FCD 19794-5, Biometric Data Interchange Formats—Part 5: Face Image Data", 150/IEC JTC 1/5C 37 N506, Mar. 2004, 54 pages.

European Office Action dated Mar. 12, 2015 in European Patent Application No. 13190363.5.

* cited by examiner

APPARATUS AND METHOD FOR FACE RECOGNITION

CROSS-REFERENCE TO RELATED APPLICATIONS

This application claims priority benefit from Korean Patent Application No. 10-2012-0123161, filed on Nov. 1, 2012 in the Korean Intellectual Property Office, the disclosure of which is incorporated herein by reference.

BACKGROUND

1. Field

The following description relates to an apparatus and a method for face recognition, and more particularly to, an apparatus and a method for face recognition which provides an improved degree of accuracy in face recognition.

2. Description of the Related Art

Unlike fingerprint recognition, iris recognition, and other recognition technologies which require a user's particular motion or activity, face recognition technology is evaluated as a convenient and competitive biometrics technology because it employs a non-contact method to identify a user. The face recognition technology is widely used for summary of video, identification, human computer interface (HCI) image search, security, monitoring systems, and other various application fields.

However, results of face recognition depend significantly on user's conditions such as a user's motion, change in facial expression, accuracy in organ characteristics, along with external lighting, image processing, and other conditions.

SUMMARY

Additional aspects and/or advantages will be set forth in part in the description which follows and, in part, will be apparent from the description, or may be learned by practice of the invention.

Accordingly, one or more exemplary embodiments provide an apparatus for face recognition and a control method thereof which provides an improved degree of accuracy in face recognition by selectively using an image adequate for face recognition through quality inspection of the image used for the face recognition.

The foregoing and/or other aspects may be achieved by providing a control method of an apparatus for face recognition comprising: acquiring an image through an image acquirer; extracting a facial image from the acquired image; determining whether the extracted facial image meets a predetermined quality to decide use/non-use of the extracted facial image; and performing a face recognizing operation by using the extracted facial image if the extracted facial image meets the predetermined quality.

Also, the determining whether the extracted facial image meets the predetermined quality may comprise determining on the basis of determination on a degree of similarity between the extracted facial image and a reference facial image.

Also, if the extracted facial image does not meet a predetermined quality, the acquiring the image, the extracting the facial image, and the determining the quality may be repeated until a facial image meeting the predetermined quality to be used for face recognition is obtained.

Also, the performing the face recognizing operation by using the extracted facial image may comprise storing in a storage unit an extracted facial image meeting the predetermined quality.

Also, the performing the face recognizing operation by using the extracted facial image may comprise performing a predetermined pre-process with respect to the extracted facial image meeting the predetermined quality.

Also, the performing the predetermined pre-process may comprise at least one of gamma correction, contrast correction, and removal of noise with respect to the extracted facial image.

Also, the performing the face recognizing operation by using the extracted facial image may comprise recognizing a face based on determination on a degree of similarity between the extracted facial image meeting the predetermined quality and a facial image stored in the storage unit.

Also, the facial image stored in the storage unit may comprise an extracted facial image meeting the predetermined quality based on the determination on whether the facial image meets the quality.

The foregoing and/or other aspects may be achieved by providing an apparatus for face recognition comprising: an image acquirer which acquires an image; a facial image extractor which extracts a facial image comprised in the acquired image; a quality determiner which determines whether the extracted facial image meets a predetermined quality to decide use/non-use of the extracted facial image; and a controller which performs a face recognizing operation by using the extracted facial image if the extracted facial image meets the predetermined quality.

Also, the quality determiner may determine a quality of a facial image based on determination on a degree of similarity between the extracted facial image and a reference facial image.

Also, if the extracted facial image does not meet the predetermined quality, the controller may extract a facial image from an image acquired by the image acquirer after the image failing to meet the quality, and determines whether the extracted facial image meets the quality.

Also, the apparatus for face recognition may further comprise a storage unit, wherein the controller stores the extracted facial image in the storage unit if the extracted facial image meets the predetermined quality.

Also, the apparatus for face recognition may further comprise a pre-processor, wherein the controller controls the pre-processor to pre-process the extracted facial image.

Also, the pre-processing may comprise at least one of gamma correction, contrast correction, and removal of noise with respect to the extracted facial image.

Also, the apparatus for face recognition may further comprise a face recognizer, wherein the controller controls the face recognizer to perform a face recognizing operation with respect to the extracted facial image if the extracted facial image meets the predetermined quality.

Also, the face recognizer may recognize a face based on determination on a degree of similarity between the extracted facial image meeting the predetermined quality and a facial image meeting the predetermined quality and stored in the storage unit.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
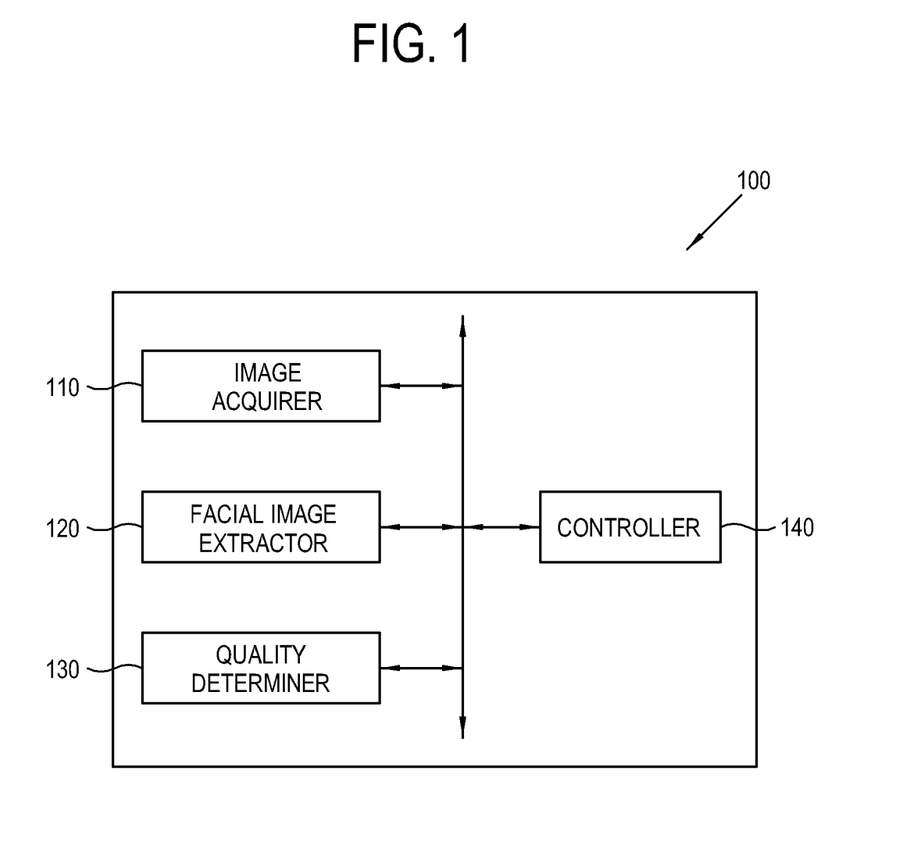
FIGS. 1 and 2 are block diagrams of an apparatus for face recognition according to an embodiment.
Figure 2:
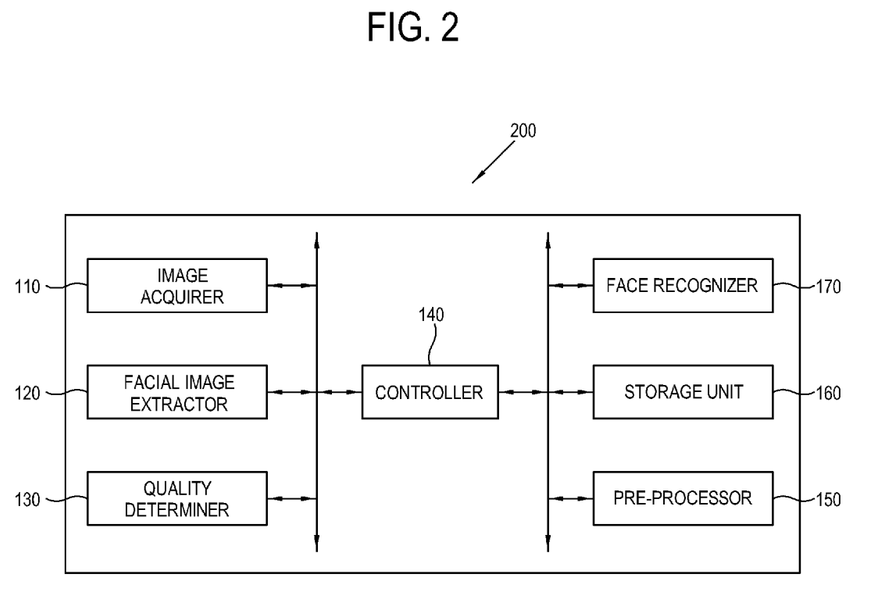

FIGS. 1 and 2 are block diagrams of apparatuses for face recognition 100 and 200 according to an embodiment. The apparatuses for face recognition 100 and 200 according to the embodiment may be provided separately or in a device such as a personal digital assistant (PDA), a mobile phone, a personal computer (PC), or a display apparatus, for example.

As shown therein, the apparatuses for face recognition 100 and 200 include an image acquirer 110, a facial image extractor 120, a quality determiner 130, and a controller 140.

The image acquirer 110 acquires a user's image, and may be implemented as a face recognition sensor or camera to acquire a user's image or video. According to an embodiment, the image acquirer 110 may be implemented as a video camera. The video refers to a plurality of still images.

The facial image extractor 120 extracts a facial image from the image acquired by the image acquirer 110, by a control of the controller 140 (to be described later). The facial extracting process relates to a process of finding the facial area from the image acquired through the image acquirer 110, and various extraction methods are well-known. The facial image extractor 120 extracts facial characteristic information from the extracted facial image. The facial characteristic information may include characteristic information on key parts of the face, such as eyes, nose and contour of the face, and skin color, shape of lips, eyes, eyebrows and nose, brows, etc. The facial image extractor 120 may modify the extracted size of the facial image to a normal size of a standard facial image.

The quality determiner 130 determines whether the extracted facial image meets a predetermined quality condition to determine whether the facial image extracted by the facial image extractor 120 is adequate to be used to recognize a face, by a control of the controller 140 (to be described later).

To determine whether the extracted facial image meets the predetermined quality condition, the quality determiner 130 determines a degree of similarity between the extracted facial image and a reference facial image.

The reference facial image may be a representative facial image based on a database collection of facial images of various people.

The facial images which are included in the database and are a basis for the reference facial image are formed to meet predetermined quality conditions, respectively.

The predetermined quality conditions for respective facial images included in the database are facial images which clearly show each organ such as eyes, nose, and lips, and the facial contour forming the facial images.

The predetermined quality conditions for respective facial images included in the database may be facial images with particular facial expressions. Such facial images may be facial images in which a temporary change in facial expression is not excessive, such as photos used for identification, for example.

The predetermined quality conditions for respective facial images included in the database may be front facial images as particular poses.

The predetermined quality conditions for respective facial images included in the database may be facial images for which uniform illumination is provided, rather than the facial images for which inconsistent illumination, such as sidelight, for example, is provided.

The predetermined quality conditions for respective facial images included in the database may be facial images of which a facial brightness value falls within a predetermined range.

The reference facial image data which are based on facial images meeting at least one of the predetermined quality conditions may be stored in advance in a storage unit (not shown).

To check whether the extracted facial image meets a predetermined quality condition, the quality determiner 130 matches the extracted facial image with the reference facial image. The matching algorithm may include an image correlation algorithm, for example. That is, the image correlation algorithm may be used to generate data of the brightness of the facial image subject to quality determination, and the reference facial image for comparison, and compares pixels of the facial image subject to quality determination, and the reference facial image.

The degree of similarity between the extracted facial image subject to quality determination and the reference facial image may be used to determine whether the extracted facial image meets a predetermined quality condition. If the degree of similarity between the extracted facial image and the reference facial image is a preset reference degree or higher, the extracted facial image may be determined to meet the predetermined quality condition.

The determination of the degree of similarity may not relate to recognizing a particular face, and thus the preset reference degree of similarity may be lower than the reference similarity for determining a degree of similarity for the facial recognition (to be described later).

Accordingly, if each organ and contour of the face of the extracted facial image is not clear, or the facial image includes a dramatically-changing facial expression, deviated pose against the front side, or include a facial image with sidelight that is not uniform, the extracted facial image is determined to be not similar to the reference facial image, and does not meet the predetermined quality condition. Therefore, it is determined that the extracted facial image is not suitable to be used to recognize a face.

The quality determiner 130 according to the embodiment may determine whether characteristic information of the extracted facial image falls within a preset range to decide whether or not to use the extracted facial image.

The predetermined range which is a basis for determination is set up based on the reference facial image meeting the predetermined quality condition. For example, coordinate values of each organ extracted from the facial image and corresponding pixel values are characteristic information of the reference facial image, and are set in advance to be within a predetermined range from coordinate values of each organ such as eyes, nose, lips, etc. and pixel values corresponding to the coordinate values.

The quality determiner 130 determines whether the coordinate values of each organ as the facial characteristic information extracted from the facial image and pixel values corresponding to the coordinate values are within the predetermined range provided on the basis of the reference facial image, and if so, determines that the extracted facial image meets the quality condition.

For example, if the pixel values corresponding to each organ extracted from the facial image are not within the predetermined range provided on the basis of the reference facial image, the quality determiner 130 may determine that the facial image does not meet a quality condition regarding a clarity or illumination state of each organ.

For example, if the coordinate values corresponding to each organ extracted from the facial image are not within the predetermined range provided on the basis of the reference facial image, the quality determiner 130 may determine that the facial image does not meet a quality condition regarding a particular pose or particular facial expression such as a front face.

For example, if entire pixel values of the facial image subject to quality determination are not within a predetermined range provided on the basis of the reference facial image, the quality determiner 130 may determine that the facial image does not meet a quality condition regarding brightness.

The controller 140 controls overall elements of the apparatus for face recognition 100. The controller 140 controls the facial image extractor 120 to extract a facial image from the image acquired by the image acquirer 110, and controls the quality determiner 130 to determine whether the extracted facial image meets the predetermined quality condition to thereby decide use/non-use of the extracted facial image. If it is determined that the facial image meets the predetermined quality, the controller may perform a face recognizing operation (to be described later) by using the extracted facial image.

Hereinafter, a facial recognizing operation using the extracted facial image will be described with reference to FIG. 2.

As shown therein, an apparatus for face recognition 200 includes an image acquirer 110, a facial image extractor 120, a quality determiner 130, a controller 140, a pre-processor 150, a storage unit 160, and a face recognizer 170.

The image acquirer 110, the facial image extractor 120, and the quality determiner 130 have the same configuration as those according to the embodiment in FIG. 1, and thus a detailed description will be omitted.

If the extracted facial image meets a predetermined quality, the pre-processor 150 analyzes an illumination condition of the extracted facial image and pre-processes the facial image corresponding to the illumination condition, by a control of the controller 140.

The pre-processor 150 may include a histogram smoother (not shown), a gamma corrector (not shown), a Wiener filter (not shown), a log filter (not shown), and a contrast corrector (not shown).

The histogram smoother transforms a histogram of the extracted facial image into uniform distribution. The gamma corrector eases a non-uniform illumination condition of the smoothed image. The Wiener filter removes noise from the image corrected by the gamma corrector. The log filter extracts a facial characteristic of the facial image from which the noise has been removed by the Wiener filter. The contrast corrector improves a contrast of the facial characteristic extracted by the log filter.

Accordingly, a facial image from which the effect of the illumination has been eased to more clearly show the facial characteristic may be obtained.

The controller 140 stores in the storage unit 160 facial characteristic data included in the facial image corrected by the pre-processor 150. The facial characteristic data may be extracted by a predetermined algorithm by a control of the controller 140. Various algorithms for extracting the facial characteristic data are well-known.

If the extracted facial image meets a predetermined quality condition, the controller 140 may extract the facial characteristic data of the extracted facial image and store the data in the storage unit 160, rather than pre-processing the extracted facial image.

The facial characteristic data stored in the storage unit 160 is referred to for the face recognizer 170 to recognize a face. The storage unit 160 may store therein the reference facial image data, which is a basis for quality determination, according to the embodiment in FIG. 1.

If the extracted facial image meets a predetermined quality condition, the face recognizer 170 performs a face recognizing operation with respect to the extracted facial image to identify a user.

The face recognizer 170 determines whether the facial characteristic data extracted from the facial image meeting the predetermined quality has a degree of preset reference similarity or more with respect to the facial characteristic data stored in the storage unit 160 to recognize a face. The degree of reference similarity used for face recognition may be higher than the degree of reference similarity used for quality determination according to the embodiment. The facial characteristic data stored in the storage unit 160 includes characteristic data of the facial image which is determined to meet the predetermined quality condition.

Accordingly, the facial image meeting the predetermined quality is recognized and the degree of accuracy of face recognition may be improved.

The apparatuses for face recognition 100 and 200 according to the embodiment may be included in a display apparatus.

A display apparatus (not shown) including the apparatuses for face recognition 100 and 200 includes a signal input/output unit (not shown) to/from which at least one image signal is input/output, an image processor (not shown) which processes an image signal received through the signal input/output unit, a display unit (not shown) which displays an image thereon based on the image signal processed by the image processor, a user input unit (not shown) which receives a user's selection, and a controller (not shown) which controls overall elements of the display apparatus.

The signal input/output unit transmits the received image signal to the image processor, and varies depending on a standard of a received signal or embodiment type of an image supply source and the display apparatus. For example, the signal input/output unit may receive signals/data according to standards such as high definition multimedia interface (HDMI), universal serial bus (USB), or Component, for example, and may include a plurality of connection terminals (not shown) corresponding to the foregoing standards.

The image processor processes an image signal transmitted by the signal input/output unit and an image signal supplied by an image supply source (not shown), according to preset various image processing operations. The image processor outputs the processed image signal to the display unit, on which an image may be displayed on the basis of the processed image signal.

The image processing operation of the image processor may include, but is not limited to, a de-multiplexing operation for dividing a predetermined signal, a decoding operation corresponding to an image format of an image signal, a de-interlacing operation for converting an interlace image signal into a progressive image signal, a scaling operation for adjusting an image signal into a preset resolution, a noise reduction operation for improving an image quality, a detail enhancement operation, or a frame refresh rate conversion, for example.

The display unit displays an image thereon based on an image signal processed by the image processor. The display type of the display unit includes, but is not limited to, a liquid crystal display (LCD), a plasma display panel (PDP), a light-emitting diode (LED), an organic light emitting diode (OLED), a surface-conduction electron-emitter, a carbon nano-tube, or nano-crystal, for example.

The user input unit transmits preset various control commands or unlimited information to the controller by a user's manipulation and input. The user input unit may be implemented as a menu key and an input panel installed in an external part of the display apparatus, or a remote controller which is separated/spaced apart from the display apparatus.

The user input unit may be integrally formed in the display unit. That is, if the display unit is a touch screen, a user may input a preset command through an input menu (not shown) displayed on the display unit.

The user input unit may receive a user's command relating to the face recognizing operation of the apparatuses for face recognition 100 and 200 according to the embodiment.

The controller controls various elements of the display apparatus. For example, the controller controls the image processor to process an image, and performs a control operation in response to a command from the user input unit to thereby control entire operations of the display apparatus.

The controller may include the controller 140 of the apparatuses for face recognition 100 and 200 or may be provided separately.

Figure 3:
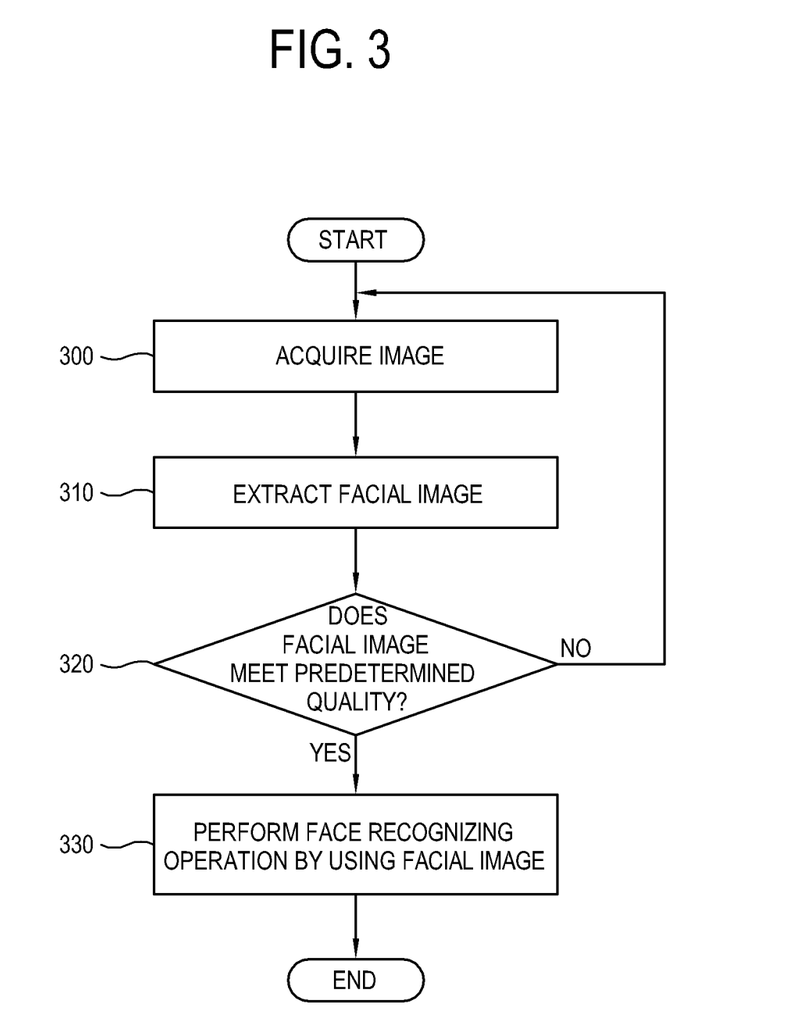
FIGS. 3 to 5 are flowcharts illustrating a control method of the apparatus for face recognition according to the embodiment.
Figure 4:
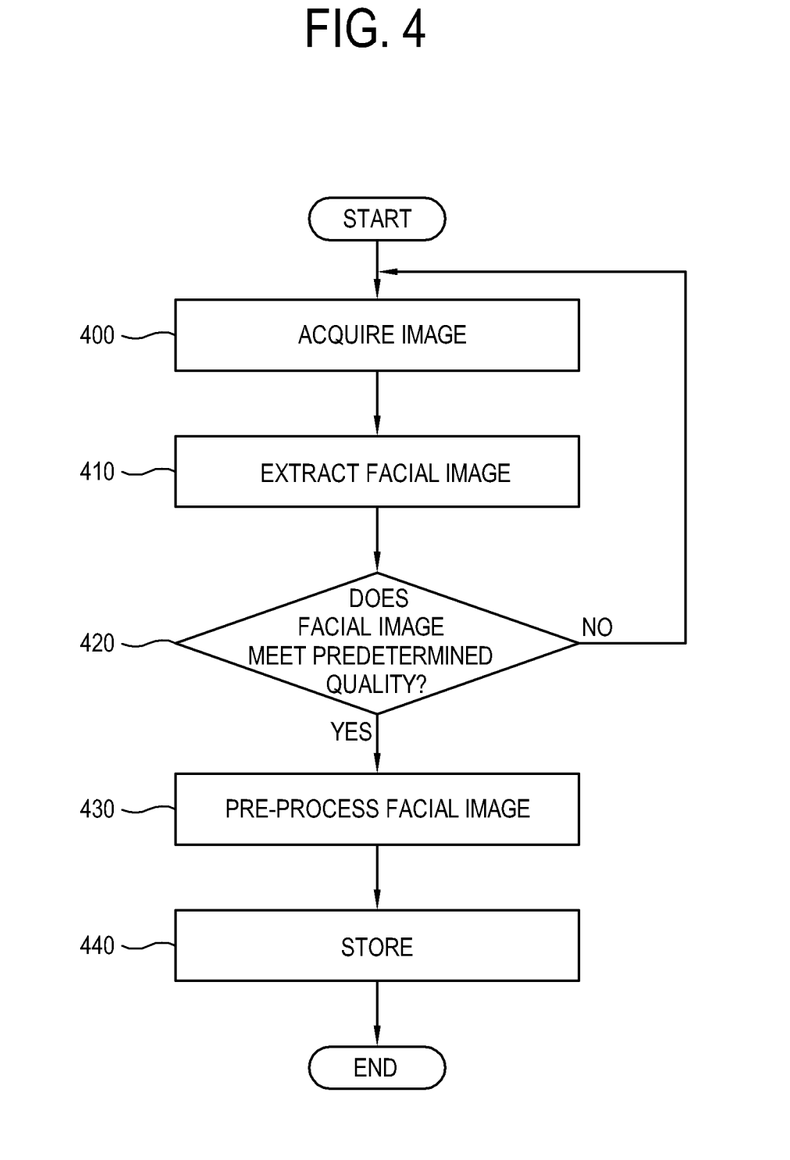
Figure 5:
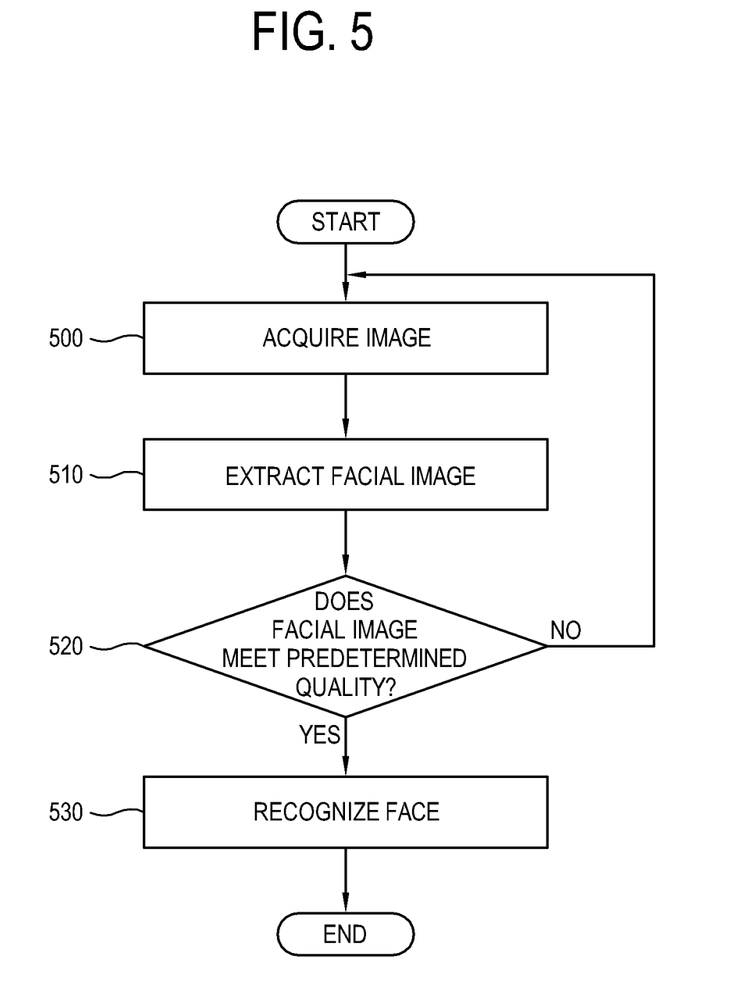

Hereinafter, a control method of the apparatuses for face recognition 100 and 200 according to the embodiment will be described with reference to FIGS. 3 to 5.

As shown therein, the image acquirer acquires the image including a user (operations 300, 400, and 500). The facial image extractor extracts the facial image from the acquired image (operations 310, 410, and 510). The quality determiner determines whether the extracted facial image meets the predetermined quality condition to decide use/non-use of the extracted facial image (operations 320, 420, and 520). The determination of quality may be based on the determination of the degree of similarity between the extracted facial image and the reference facial image. Otherwise, the determination of quality may include a determination of whether the characteristic information of the extracted facial image is within the preset range.

If it is determined that the extracted facial image does not meet the predetermined quality condition, operations of acquiring a new image, of extracting the facial image, and of determining quality are repeated to acquire a facial image meeting the quality condition. A new image may be acquired by consecutively photographing still images through the image acquirer implemented as a video camera. The consecutively photographed images are stored in the storage unit. If the previous facial image does not meet the quality condition, the consecutively acquired images may be used to determine a quality of next images.

If it is determined that the facial image meets the predetermined quality condition, the controller performs the face recognizing operation by using the extracted facial image (operation 330).

The operation of performing the face recognizing operation by using the extracted facial image (operation 330) may include, e.g., an operation of performing a predetermined pre-processing with respect to the facial image meeting the quality condition (operation 430). The operation of pre-processing may include at least one of correcting gamma, correcting contrast, and removing noise from the extracted facial image by the pre-processor.

The operation of performing the face recognizing operation by using the extracted facial image (operation 330) may include an operation of storing in the storage unit the facial image corrected by the pre-processor (operation 440). The facial image stored in the storage unit is stored in the form of facial characteristic data extracted by a predetermined algorithm.

The operation of performing the face recognizing operation by using the extracted facial image (operation 330) may include an operation of storing in the storage unit the facial image meeting the predetermined quality condition, rather than pre-processing the facial image.

The facial characteristic data stored in the storage unit may be referred to at operation of recognizing a face by the face recognizer (operation 530) (to be described later).

The operation of performing the face recognizing operation by using the extracted facial image (operation 330) may include an operation of performing a face recognizing operation with respect to the facial image meeting a predetermined quality determined at operation 520 (operation 530).

The face recognizer may recognize a face for user identification based on the determination of degree of similarity between the facial image meeting the predetermined quality at operation 520 and the facial image stored in the storage unit. The facial image stored in the storage unit includes a facial image stored in the storage unit at operation 440 with respect to the facial image meeting the predetermined quality condition determined at operation 420.

Accordingly, any poor facial image is not used in recognizing a face, and the face recognizing operation is performed with respect to the facial image meeting the predetermined quality condition, to thereby improve a degree of accuracy in recognizing a face.

As described above, the degree of accuracy in recognizing a face may be improved through a quality inspection of an image used for the face recognition.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A control method of an apparatus for face recognition comprising:
acquiring an image through an image acquirer;
extracting a facial image from the acquired image;
determining a degree of correlation between the extracted facial image and a reference facial image; and
selectively performing a face recognizing operation by using the extracted facial image if the determined degree of correlation is greater than a predetermined threshold.

2. The control method according to claim 1, wherein if the determined degree of correlation is not greater than the predetermined threshold, the acquiring the image, the extracting the facial image, and the determining the degree of correlation are repeated.

3. The control method according to claim 1, wherein the performing the face recognizing operation by using the extracted facial image comprises storing an extracted facial image.

4. The control method according to claim 1, wherein the performing the face recognizing operation by using the extracted facial image comprises performing a predetermined pre-process with respect to the extracted facial image.

5. The control method according to claim 4, wherein the performing the predetermined pre-process comprises at least one of gamma correction, contrast correction, and removal of noise with respect to the extracted facial image.

6. The control method according to claim 1, wherein the performing the face recognizing operation by using the extracted facial image comprises recognizing a face based on determination on a degree of similarity between the extracted facial image and a stored facial image.

7. The control method according to claim 6, wherein the stored facial image comprises an extracted facial image where the determined degree of correlation is greater than the predetermined threshold.

8. A non-transitory computer-readable recording medium storing a program to implement the method of claim 1.

9. The control method according to claim 1, wherein the reference facial image comprises a representative facial image based on a database collection of facial images of various people.

10. An apparatus for face recognition comprising:
an image acquirer which acquires an image;
a facial image extractor which extracts a facial image from the acquired image;
a quality determiner which determines a degree of correlation between the extracted facial image and a reference facial image; and
a controller which performs a face recognizing operation by using the extracted facial image if the determined degree of correlation is greater than a predetermined threshold.

11. The apparatus for face recognition according to claim 10, wherein if the determined degree of correlation is not greater than the predetermined threshold, the acquiring the image, the extracting the facial image, and the determining the degree of correlation are repeated.

12. The apparatus for face recognition according to claim 10, further comprising a storage unit, wherein the controller stores the extracted facial image in the storage unit if the determined degree of correlation is greater than the predetermined threshold.

13. The apparatus for face recognition according to claim 10, further comprising a pre-processor, wherein the controller controls the pre-processor to pre-process the extracted facial image.

14. The apparatus for face recognition according to claim 13, wherein the pre-processing comprises at least one of gamma correction, contrast correction, and removal of noise with respect to the extracted facial image.

15. The apparatus for face recognition according to claim 10, further comprising a face recognizer, wherein the controller controls the face recognizer to perform a face recognizing operation with respect to the extracted facial image if the determined degree of correlation is greater than the predetermined threshold.

16. The apparatus for face recognition according to claim 15, wherein the face recognizer recognizes a face based on a degree of similarity between the extracted facial image and a stored facial image.

* * * * *